(12) United States Patent  
Spalink et al.

(10) Patent No.: US 8,321,952 B2  
(45) Date of Patent: *Nov. 27, 2012

(54) METHOD AND SYSTEM FOR MONITORING ONLINE COMPUTER NETWORK BEHAVIOR AND CREATING ONLINE BEHAVIOR PROFILES

(75) Inventors: Jan-Dieter Spalink, Durham, NC (US); Brian R. D. Gullette, Durham, NC (US); Andrew Hatchell, Cary, NC (US); Randall C. Nortman, Cary, NC (US)

(73) Assignee: Hitwise Pty. Ltd., Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/168,881

(22) Filed: Jun. 24, 2011

(65) Prior Publication Data

US 2011/0255688 A1    Oct. 20, 2011

Related U.S. Application Data

(63) Continuation of application No. 12/361,679, filed on Jan. 29, 2009, now Pat. No. 7,996,912, which is a continuation of application No. 09/608,135, filed on Jun. 30, 2000, now abandoned.

(51) Int. Cl.  
*H04L 29/00* (2006.01)

(52) U.S. Cl. ............................................ 726/26; 705/74

(58) Field of Classification Search ......................... None  
See application file for complete search history.

(56) References Cited

U.S. PATENT DOCUMENTS

| | | | |
|---|---|---|---|
| 5,053,956 A | 10/1991 | Donald et al. | |
| 5,590,038 A | 12/1996 | Pitroda | |
| 5,640,577 A | 6/1997 | Scharmer | |
| 5,659,731 A | 8/1997 | Gustafson | |
| 5,666,528 A | 9/1997 | Thai | |
| 5,692,107 A | 11/1997 | Simoudis et al. | |
| 5,754,939 A | 5/1998 | Herz et al. | |
| 5,774,692 A | 6/1998 | Boyer et al. | |
| 5,797,136 A | 8/1998 | Boyer et al. | |
| 5,812,840 A | 9/1998 | Shwartz | |
| 5,822,750 A | 10/1998 | Jou et al. | |
| 5,822,751 A | 10/1998 | Gray et al. | |
| 5,825,884 A | 10/1998 | Zdepski et al. | |
| 5,835,915 A | 11/1998 | Carr et al. | |
| 5,844,218 A | 12/1998 | Kawan et al. | |
| 5,881,131 A | 3/1999 | Farris et al. | |
| 5,933,827 A | 8/1999 | Cole et al. | |

(Continued)

FOREIGN PATENT DOCUMENTS

GB    2 346 229    8/2000

(Continued)

OTHER PUBLICATIONS

U.S. Appl. No. 12/705,489, filed Feb. 12, 2010, Bargoli et al.

(Continued)

*Primary Examiner* — Minh Dinh  
(74) *Attorney, Agent, or Firm* — Knobbe, Martens, Olson & Bear LLP

(57) ABSTRACT

A method and system for monitoring users on one or more computer networks, disassociating personally identifiable information from the collected data, and storing it in a database so that the privacy of the users is protected. In one embodiment, the system generates an anonymized identifier and associates that anonymized identifier with collected network data. An embodiment of the system may further anonymize data such as resource location identifiers, by identifying and removing personal information.

23 Claims, 7 Drawing Sheets

U.S. PATENT DOCUMENTS

| | | |
|---|---|---|
| 5,956,693 A | 9/1999 | Geerlings |
| 5,961,593 A | 10/1999 | Gabber et al. |
| 5,963,932 A | 10/1999 | Jakobsson et al. |
| 5,990,038 A | 11/1999 | Suga et al. |
| 5,991,735 A | 11/1999 | Gerace |
| 6,018,619 A | 1/2000 | Allard et al. |
| 6,038,551 A | 3/2000 | Barlow et al. |
| 6,070,147 A | 5/2000 | Harms et al. |
| 6,073,140 A | 6/2000 | Morgan et al. |
| 6,128,602 A | 10/2000 | Northington et al. |
| 6,128,624 A | 10/2000 | Papierniak et al. |
| 6,134,441 A | 10/2000 | Astrom et al. |
| 6,144,957 A | 11/2000 | Cohen et al. |
| 6,151,601 A | 11/2000 | Papierniak et al. |
| 6,157,927 A | 12/2000 | Schaefer et al. |
| 6,223,171 B1 | 4/2001 | Chaudhuri et al. |
| 6,304,869 B1 | 10/2001 | Moore et al. |
| 6,339,769 B1 | 1/2002 | Cochrane et al. |
| 6,366,903 B1 | 4/2002 | Agrawal et al. |
| 6,405,173 B1 | 6/2002 | Honarvar |
| 6,446,200 B1 | 9/2002 | Ball et al. |
| 6,457,012 B1 | 9/2002 | Jatkowski |
| 6,496,819 B1 | 12/2002 | Bello et al. |
| 6,496,931 B1 | 12/2002 | Rajchel et al. |
| 6,523,022 B1 | 2/2003 | Hobbs |
| 6,523,041 B1 | 2/2003 | Morgan et al. |
| 6,546,393 B1 | 4/2003 | Khan |
| 6,553,367 B2 | 4/2003 | Horovitz et al. |
| 6,574,623 B1 | 6/2003 | Laung et al. |
| 6,601,173 B1 | 7/2003 | Mohler |
| 6,631,496 B1 | 10/2003 | Li et al. |
| 6,654,813 B1 | 11/2003 | Black et al. |
| 6,748,426 B1 | 6/2004 | Shaffer et al. |
| 6,766,327 B2 | 7/2004 | Morgan, Jr. et al. |
| 6,792,458 B1 | 9/2004 | Muret et al. |
| 6,804,346 B1 | 10/2004 | Mewhinney |
| 6,804,701 B2 | 10/2004 | Muret et al. |
| 6,850,895 B2 | 2/2005 | Brodersen et al. |
| 6,910,624 B1 | 6/2005 | Natsuno |
| 6,934,714 B2 | 8/2005 | Meinig |
| 6,947,984 B2 | 9/2005 | Schweitzer et al. |
| 6,983,379 B1 | 1/2006 | Spalink et al. |
| 6,983,478 B1 | 1/2006 | Grauch et al. |
| 6,985,887 B1 | 1/2006 | Sunstein et al. |
| 7,003,504 B1 | 2/2006 | Angus et al. |
| 7,020,082 B2 | 3/2006 | Bhagavath et al. |
| 7,028,001 B1 | 4/2006 | Muthuswamy et al. |
| 7,035,855 B1 | 4/2006 | Kilger et al. |
| 7,047,251 B2 | 5/2006 | Reed et al. |
| 7,050,989 B1 | 5/2006 | Hurt et al. |
| 7,076,475 B2 | 7/2006 | Honarvar |
| 7,082,435 B1 | 7/2006 | Guzman et al. |
| 7,184,974 B2 | 2/2007 | Shishido |
| 7,185,016 B1 | 2/2007 | Rasmussen |
| 7,200,602 B2 | 4/2007 | Jonas |
| 7,249,048 B1 | 7/2007 | O'Flaherty |
| 7,272,591 B1 | 9/2007 | Ghazal et al. |
| 7,277,900 B1 | 10/2007 | Ganesh et al. |
| 7,333,976 B1 | 2/2008 | Auerbach et al. |
| 7,370,044 B2 | 5/2008 | Mulhern et al. |
| 7,373,335 B2 | 5/2008 | Cleghorn et al. |
| 7,403,942 B1 | 7/2008 | Bayliss |
| 7,421,442 B2 | 9/2008 | Gelb et al. |
| 7,424,439 B1 | 9/2008 | Fayyad et al. |
| 7,433,864 B2 | 10/2008 | Malik |
| 7,451,113 B1 | 11/2008 | Kasower |
| 7,467,127 B1 | 12/2008 | Baccash et al. |
| 7,529,698 B2 | 5/2009 | Joao |
| 7,536,346 B2 | 5/2009 | Aliffi et al. |
| 7,562,093 B2 | 7/2009 | Gelb et al. |
| 7,593,889 B2 | 9/2009 | Raines et al. |
| 7,596,512 B1 | 9/2009 | Raines et al. |
| 7,596,716 B2 | 9/2009 | Frost et al. |
| 7,668,725 B2 | 2/2010 | Alston |
| 7,672,833 B2 | 3/2010 | Blume et al. |
| 7,672,924 B1 | 3/2010 | Scheurich et al. |
| 7,672,926 B2 | 3/2010 | Ghazal et al. |
| 7,689,505 B2 | 3/2010 | Kasower |
| 7,747,559 B2 | 6/2010 | Leitner et al. |
| 7,752,236 B2 | 7/2010 | Williams et al. |
| 7,797,252 B2 | 9/2010 | Rosskamm et al. |
| 7,983,932 B2 | 7/2011 | Kane |
| 7,996,912 B2 | 8/2011 | Spalink et al. |
| 8,078,453 B2 | 12/2011 | Shaw |
| 8,099,341 B2 | 1/2012 | Varghese |
| 2001/0011245 A1 | 8/2001 | Duhon |
| 2002/0010664 A1 | 1/2002 | Rabideau et al. |
| 2002/0026507 A1 | 2/2002 | Sears et al. |
| 2002/0052884 A1 | 5/2002 | Farber et al. |
| 2002/0069122 A1 | 6/2002 | Yun et al. |
| 2002/0082892 A1 | 6/2002 | Raffel et al. |
| 2002/0099628 A1 | 7/2002 | Yakaoka et al. |
| 2002/0103809 A1 | 8/2002 | Starzl et al. |
| 2002/0128962 A1 | 9/2002 | Kasower |
| 2002/0133504 A1 | 9/2002 | Vlahos et al. |
| 2002/0169747 A1 | 11/2002 | Chapman et al. |
| 2002/0188544 A1 | 12/2002 | Wizon et al. |
| 2002/0198824 A1 | 12/2002 | Cook |
| 2003/0009418 A1 | 1/2003 | Green et al. |
| 2003/0018549 A1 | 1/2003 | Fei et al. |
| 2003/0018578 A1 | 1/2003 | Schultz |
| 2003/0097380 A1 | 5/2003 | Mulhern et al. |
| 2003/0101344 A1 | 5/2003 | Wheeler et al. |
| 2003/0105728 A1 | 6/2003 | Yano et al. |
| 2003/0212654 A1 | 11/2003 | Harper et al. |
| 2003/0229892 A1 | 12/2003 | Sardera |
| 2004/0111359 A1 | 6/2004 | Hudock |
| 2004/0117358 A1 | 6/2004 | Von Kaenel et al. |
| 2004/0128150 A1 | 7/2004 | Lundegren |
| 2004/0153330 A1 | 8/2004 | Miller et al. |
| 2004/0153448 A1 | 8/2004 | Cheng et al. |
| 2004/0199456 A1 | 10/2004 | Flint et al. |
| 2004/0199789 A1 | 10/2004 | Shaw et al. |
| 2004/0220896 A1 | 11/2004 | Finlay et al. |
| 2004/0225594 A1 | 11/2004 | Nolan, III et al. |
| 2004/0230534 A1 | 11/2004 | McGough |
| 2005/0137899 A1 | 6/2005 | Davies et al. |
| 2005/0187948 A1 | 8/2005 | Monitzer et al. |
| 2006/0020611 A1 | 1/2006 | Gilbert et al. |
| 2006/0074991 A1 | 4/2006 | Lussier et al. |
| 2006/0184585 A1 | 8/2006 | Grear et al. |
| 2006/0242047 A1 | 10/2006 | Haggerty et al. |
| 2006/0271472 A1 | 11/2006 | Cagan |
| 2006/0282359 A1 | 12/2006 | Nobili et al. |
| 2007/0067297 A1 | 3/2007 | Kublickis |
| 2007/0118393 A1 | 5/2007 | Rosen et al. |
| 2007/0156554 A1 | 7/2007 | Nikoley et al. |
| 2007/0174122 A1 | 7/2007 | Howard et al. |
| 2007/0282730 A1 | 12/2007 | Carpenter et al. |
| 2007/0299759 A1 | 12/2007 | Kelly |
| 2008/0028067 A1 | 1/2008 | Berkhin et al. |
| 2008/0059224 A1 | 3/2008 | Schechter |
| 2008/0183504 A1 | 7/2008 | Highley |
| 2008/0301016 A1 | 12/2008 | Durvasula et al. |
| 2008/0320575 A1 | 12/2008 | Gelb et al. |
| 2009/0024505 A1 | 1/2009 | Patel et al. |
| 2009/0048877 A1 | 2/2009 | Binns et al. |
| 2009/0106846 A1 | 4/2009 | Dupray et al. |
| 2009/0112650 A1 | 4/2009 | Iwane |
| 2009/0234665 A1 | 9/2009 | Conkel |
| 2010/0094758 A1 | 4/2010 | Chamberlain et al. |
| 2010/0145840 A1 | 6/2010 | Kasower |
| 2010/0169159 A1 | 7/2010 | Rose et al. |
| 2010/0185546 A1 | 7/2010 | Pollard |
| 2011/0016042 A1 | 1/2011 | Cho et al. |
| 2011/0029388 A1 | 2/2011 | Kendall et al. |
| 2011/0071950 A1 | 3/2011 | Ivanovic |
| 2011/0255688 A1 | 10/2011 | Spalink et al. |
| 2012/0016948 A1 | 1/2012 | Sinha |
| 2012/0047219 A1 | 2/2012 | Feng et al. |
| 2012/0095927 A1 | 4/2012 | Hirtenstein et al. |

FOREIGN PATENT DOCUMENTS

| | | |
|---|---|---|
| JP | 10-222559 | 8/1998 |
| JP | 10-261009 | 9/1998 |
| JP | 2000-331068 | 11/2000 |
| JP | 2001-297141 | 10/2001 |

| | | |
|---|---|---|
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| WO | WO 00/57611 | 9/2000 |
| WO | WO 01/25896 | 4/2001 |
| WO | WO 01/84281 | 11/2001 |
| WO | WO 2004/114160 | 12/2004 |
| WO | WO 2008/054403 | 5/2008 |
| WO | WO 2009/117518 | 9/2009 |
| WO | WO 2010/062537 | 6/2010 |
| WO | WO 2010/150251 | 12/2010 |
| WO | WO 2011/005876 | 1/2011 |

OTHER PUBLICATIONS

U.S. Appl. No. 12/705,511, filed Feb. 12, 2010, Bargoli et al.
"Aggregate and Analyze Social Media Content:Gain Faster and Broader Insight to Market Sentiment"; SAP Partner; Mantis Technology Group; pp. 4; 2012.
"Intelligent Miner Applications Guide"; Chapters 4-7; pp. 33-132; IBM Corp., Apr. 2, 1999.
"Japan's JAAI system appraises used cars over internet", Asia Pulse, Mar. 3, 2000.
"WashingtonPost.com and Cars.com launch comprehensive automotive web site for the Washington area". PR Newswire, Oct. 22, 1998.
Elmasri et al., "Fundamentals of Database Systems, Third Edition (Excerpts),"pp. 253, 261, 268-270, 278-280, 585, 595, Jun. 2000.
Ettore, Paul Kahn on Exceptional Marketing. Management Review, vol. 38(11), Nov. 1994, pp. 48-51.
Ideon, Credit-Card Registry that Bellyflopped this Year, Is Drawing some Bottom-Fishers, The Wall Street Journal, Aug. 21, 1995, pp. C2.
Leskovec, Jure; "Social Media Analytics: Tracking, Modeling and Predicting the Flow of Information through Networks"; WWW 2011—Tutorial; Mar. 28-Apr. 1, 2011; Hyderabad, India; pp. 277-278.
Loshin, Intelligent Enterprise: Better Insight for Business Decisions, "Value-Added Data: Merge Ahead", Feb. 9, 2000, vol. 3, No. 3, 5 pages.
Miller, Joe, "NADA used-car prices go online". Automotive News, Jun. 14, 1999, p. 36.
Sawyers, Arlena "NADA to offer residual guide". Automotive News, May 22, 2000, p. 3.
Tao, Lixin, "Shifting Paradigms with the Application Service Provider Model"; Concordia University, Canada; IEEE; Oct. 2001.
Various Posts from the <p2p.wrox.com> Forums: http://web.archive.org/web/2005045221950/http://p2p.wrox.com/topic.asp?TOPIC_ID=6513, dated Nov. 15, 2003—Oct. 7, 2004, SQL—Computing Percentage of Total.
Web Page posted at: http://web.archive.org/web20040805124909/http://www.oracle.com/technology/sample_codete/tech/pl_sql/htdocs/x/Case/start.htm, pp. 1 and 4 of the webs page posted on Jan. 7, 2003, Using CASE Statements in PL/SQL Programs.
Census Geography, Excerpted from the Geographic Reference Manual, Nov. 1994, pp. 5.
Brick, et al. "Unit and Item Response, Weighting, and Imputation Procedures in the 1993 National Household Education Survey (NHES:93)" U.S. Department of Education. National Center for Education Statistics, Working Paper No. 97-05, Washington, D.C., pp. 30, Feb. 1997.
Cáceres, et al., "Measurement and Analysis of IP Network Usage and Behavior", IEEE Communications Magazine, pp. 144-151, May 2000.
Rupp, et al., "INDEX: A Platform for Determining how People Value the Quality of their Internet Access", Proceedings of the Sixth IEEE/IFIP International Workshop on Quality of Service, Napa, CA, pp. 85-90, May 1998.
Sax, Michael M., Data Collection and Privacy Protection: An International Perspective, Presentation: Managing Online Risk and Liability Conference, Aug. 31, 1999, pp. 58.
Schneier, B. "Applied Cryptography", John Wiley & Sons, Second Edition, pp. 435-447, 1996.
Stallings, W. "Cryptography and Network Security Principles and Practice", Prentice Hall, Second Edition, pp. 295, 297, Jul. 15, 1998.
Web Pages printed Nov. 2, 2004 of Internet Draft entitled "Tunneling SSL Through a WWW Proxy", Luotonen, Ari, Netscape Communications Corporation (Dec. 14, 1995); 4 pages. http://muffin.doit.org/docs/rfc/tunneling.sub.--ssl.html.

| ISP | POP | AID | Start Date | End Date | Remote IP | Remote Port | Packets To | Bytes To | Packets From | Bytes From | IP Prot |
|---|---|---|---|---|---|---|---|---|---|---|---|
| ISPA | CITY | fasfX3dGFjax1sdE | 6/27/99 8:50 | 6/27/99 8:50 | 204.71.200.67 | 80 | 5 | 605 | 3 | 127 | 6 |
| ISPA | CITY | fasfX3dGFjax1sdE | 6/27/99 8:50 | 6/27/99 8:50 | 208.240.76.2 | 80 | 34 | 416 | 39 | 45441 | 6 |
| ISPA | CITY | fasfX3dGFjax1sdE | 6/27/99 8:50 | 6/27/99 8:50 | 208.240.76.3 | 80 | 6 | 852 | 5 | 752 | 6 |
| ISPA | CITY | fasfX3dGFjax1sdE | 6/27/99 8:50 | 6/27/99 8:50 | 208.240.76.4 | 80 | 10 | 2138 | 9 | 4115 | 6 |
| ISPA | CITY | fasfX3dGFjax1sdE | 6/27/99 8:50 | 6/27/99 8:50 | 208.240.76.2 | 80 | 9 | 1722 | 8 | 3725 | 6 |
| ISPA | CITY | fasfX3dGFjax1sdE | 6/27/99 8:50 | 6/27/99 8:50 | 208.32.211.100 | 80 | 5 | 447 | 4 | 238 | 6 |

*Fig. 6*

| HTTP Host | HTTP URL | HTTP Version |
|---|---|---|
| com.yahoo.rd | /finance/external/cbsm/*http://cbs.marketwatch.com | HTTP/1.0 |
| com.marketwatch.cbs | /archive/20000622/news/current | HTTP/1.0 |
| com.marketwatch.cbs | /archive/images/pixel.gif | HTTP/1.0 |
| com.marketwatch.cbs | /archive/images/pixel.gif | HTTP/1.0 |
| com.marketwatch.cbs | /archive/images/pixel_black.gif | HTTP/1.0 |
| net.doubleclick.ad | /ad/cbsmw.button.com/FLAG | HTTP/1.0 |

*Fig. 7*

METHOD AND SYSTEM FOR MONITORING ONLINE COMPUTER NETWORK BEHAVIOR AND CREATING ONLINE BEHAVIOR PROFILES

CROSS-REFERENCE TO RELATED APPLICATIONS

This application is a continuation of U.S. patent application Ser. No. 12/361,679, filed Jan. 29, 2009 now U.S. Pat. No. 7,996,912, entitled METHOD AND SYSTEM FOR MONITORING ONLINE COMPUTER NETWORK BEHAVIOR AND CREATING ONLINE BEHAVIOR PROFILES, which is a continuation of U.S. patent application Ser. No. 09/608,135, filed Jun. 30, 2000 now abandoned, entitled METHOD AND SYSTEM FOR MONITORING ONLINE COMPUTER NETWORK BEHAVIOR AND CREATING ONLINE BEHAVIOR PROFILES, now abandoned. All of the aforementioned applications are hereby incorporated by reference as if set forth herein in their entireties.

BACKGROUND

This invention relates to a system and method for collecting computer network traffic, particularly Internet traffic, in a manner that does not associate personally identifiable information with network usage data, and creating online behavior profiles that are unassociated with individual users Specifically, the system and method of the invention will permit Internet Service Providers (ISP) and online merchants to monitor network usage and to create behavior profiles without violating customer confidentiality.

The Internet has rapidly grown into a center for conducting commerce with unprecedented efficiency and commercial advantage; however, the Internet also presents numerous new challenges to the development and execution of appropriate business models and processes. To design and implement effective marketing and business plans, companies need to gain a better understanding of the behavior and preferences of consumers while they are conducting Internet commerce.

In the current Internet world, it has become desirable for service providers and merchants to obtain specific information about Internet users for the purpose of improving the marketing of products and services, and tailoring products and services to meet the requirements of specific customer types. In order to obtain the most effective data describing Internet consumer behavior and preferences, it is desirable to aggregate usage data from companies that provide Internet access to their employees, and from ISPs that provide Internet access to subscribers.

However, the collection of Internet transaction data raises many concerns about consumer confidentiality and privacy. First, participating companies and ISPs desire to maintain the confidentiality of their business information such as the number of subscribers, the geographical locations of each subscriber, and general usage data.

Additionally, many users are averse to having their actions monitored and tracked. Security concerns about the Internet have prevented many users from completing online transactions. Other users have completely stayed away from the Internet because of fears that their private information might become available to third parties in an uncontrolled manner.

Therefore, it is desirable to obtain detailed information about the behavior of users while ensuring subscriber, employee, and company privacy.

Today, there are several major approaches to collecting Internet transaction data. The first is through traditional polling techniques. In this method, user behavior profiles are developed from users' answers to questionnaires regarding their Internet use. Unfortunately, this technique suffers from bias and fails to provide the detail that marketers need.

The next approach to collecting network transaction data is by using logfiles generated by network devices such as Web servers and proxies. Logfiles provide increased detail and accuracy compared to polling techniques; however, they fail to protect user privacy and confidentiality. Logfiles generally contain a username or an Internet Protocol (IP) address that can be used to tie behavior to a particular individual. Additionally, Web server logfiles alone are ineffective in characterizing user behavior because they only contain the cross-section Internet traffic going to that Web server; the Web server logfiles are unable to accurately capture the behavior of a consumer who accesses multiple Web sites to assist in making purchasing decisions.

The last general approach to collecting network transaction data involves the use of unique identifiers called "cookies" inserted into an Internet browser. When the user accesses a Web site on the Internet, the Web server can read the inserted cookie to obtain the unique identifier and then store details about the current transaction associated with the unique identifier. This method fails to capture Internet usage for users that have cookies disabled on their browsers and also fails to capture Internet usage on Web sites that do not participate in capturing and aggregating usage data. Since the captured data is not complete, any behavior profile created using the data cannot be representative of Internet usage in the aggregate.

Under current Federal Communications Commission (ICC) regulations, companies may have to provide protection of customer proprietary network information. By monitoring and recording detailed network information about individuals using logfiles or cookies, companies may be in violation of these FCC regulations. To date, there has been no effective way of obtaining online customer behavior profiles to allow service providers and merchants to tailor products and services better without possibly violating government regulations.

It becomes desirable, therefore, to provide a method and system where such information can be obtained while still maintaining the confidentiality of the customer (e.g., by characterizing such data in a manner free of personally identifiable information).

SUMMARY

In accordance with the invention, a method is provided for collecting network usage data and creating user behavior profiles therefrom. The method includes obtaining an identifier representing one or more users of a computer network, creating an anonymized identifier (AID)—defined as an identifier stripped of all personally identifiable information—using the obtained identifier, and collecting data being transmitted across the computer network. If the collected data is sent to or from a user with an anonymized identifier, a transaction record is created associating the anonymized identifier with the collected data The record is then stored in a database.

In additional embodiments of the present invention, individual users connect using any other access media available. For example, users may connect to an ISP or intranet using broadband technology such as Integrated Services Digital Network (ISDN), Digital Subscriber Line (DSL), cable modems, fiber optic networks, satellite networks, or wireless networks.

In a yet still further aspect of the invention, each user's identifier is converted to an anonymized identifier using an encryption technique such as a one-way hashing function. In more specific embodiments, the one-way hashing function is one of the following: Secure Hashing Algorithm 1 (SHA-1), Message Digest 4 (MD4), Message Digest 5 (MD5), or the Digital Encryption Standard (DES), User profiles are then created using the anonymized identifier for each user.

In a more specific embodiment of the present invention, collected network transaction data is matched to a particular user by monitoring packets to and from an authentication server such as a RADIUS server. Also, in a more specific embodiment of the present invention, anonymized identifiers are classified according to job function, access media, geographical location, or phone number of the user.

Also, in accordance with the present invention, a system is provided for collecting network usage data without associating personally identifiable information with such data. The system includes a communication port coupled to a computer network, where the communication port provides access to one or more servers; one or more processors; and a computer memory. The computer memory contains instructions to identify a user of a computer network; create an anonymized identifier representing the identified user; and store network transaction data associated with an anonymized identifier.

BRIEF DESCRIPTION OF THE DRAWINGS

Having thus briefly described the invention, the same will become better understood from the following detailed discussion, taken in conjunction with the drawings when:

FIG. 6 shows a typical aggregation server data table containing data collected from various collection engines;

FIG. 7 shows the Hypertext Transfer Protocol-specific (HTTP) fields stored in a typical aggregation server data table.

DETAILED DESCRIPTION

Figure 1:
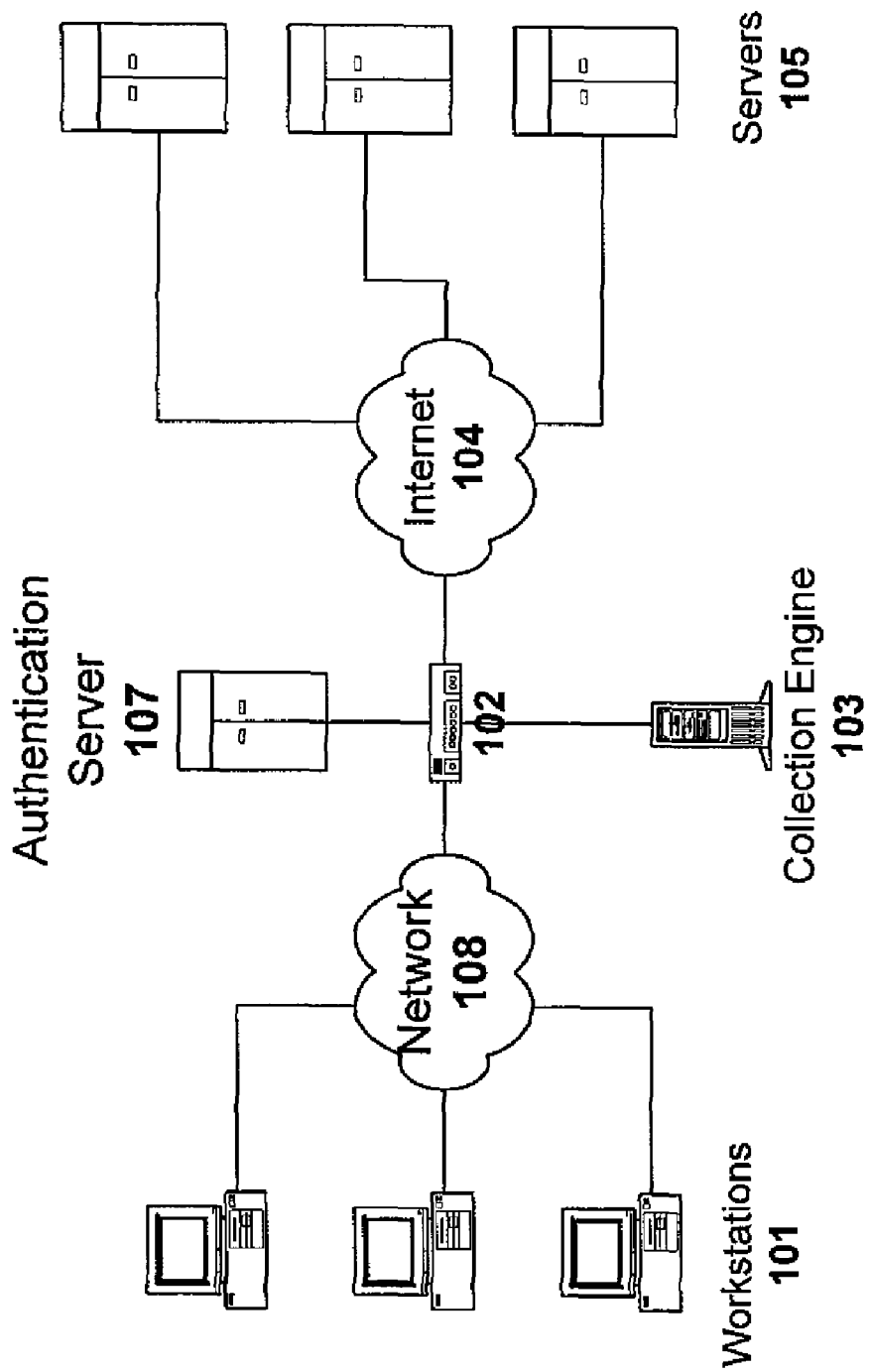
FIG. 1 is a general system schematic diagram showing users connected to a Point-Of-Presence (POP) Internet Service Provider, which is in turn connected to the Internet, and then illustrated connected typically to an ISP which connects to a Web server.

The first embodiment of the present invention provides a system and method for collecting network transaction data without associating personally identifiable information with such data. According to this embodiment, users 101 log on to an ISP 102 in the conventional manner in order to access the Internet 104 as shown in FIG. 1. Once connected, a user 101 can use a network browser such as Microsoft™ Internet Explorer™ or Netscape™ Communicator™ to access Web servers 105 on the Internet 104. Users 101 can also use any other network application to access additional network services.

According to an embodiment of the present invention, a collection engine 103 is coupled to the ISP 102 in such a manner that the collection engine 103 can monitor packets sent between users 101 and the Internet 104. The collection engine 103 is a passive device that monitors network traffic, collecting data about network transactions and recording them in a database.

In order for the collection engine 103 to create online behavioral profiles that are unassociated with individual users, the present invention uses an anonymized identifier to represent an individual user. In this embodiment of the present invention, the anonymized identifier is preferably obtained from the username of the individual user. If usernames are unavailable, the system can use any other unique identifier (e.g., MAC address, Internet Protocol (IP) address, or wireless Mobile Subscriber ISDN (MSISDN) identifier). To s maintain user anonymity, it is imperative that the original username cannot be obtained from the anonymized identifier. The present embodiment applies a one-way hashing function to the login usernames. One-way hashing functions, such as Message Digest 4 (MD4), Message Digest 5 (MD5), Secure Hashing Algorithm 1 (SHA-1), etc., are commonly used in cryptography applications including digital signatures.

Figures 2A, 2B:
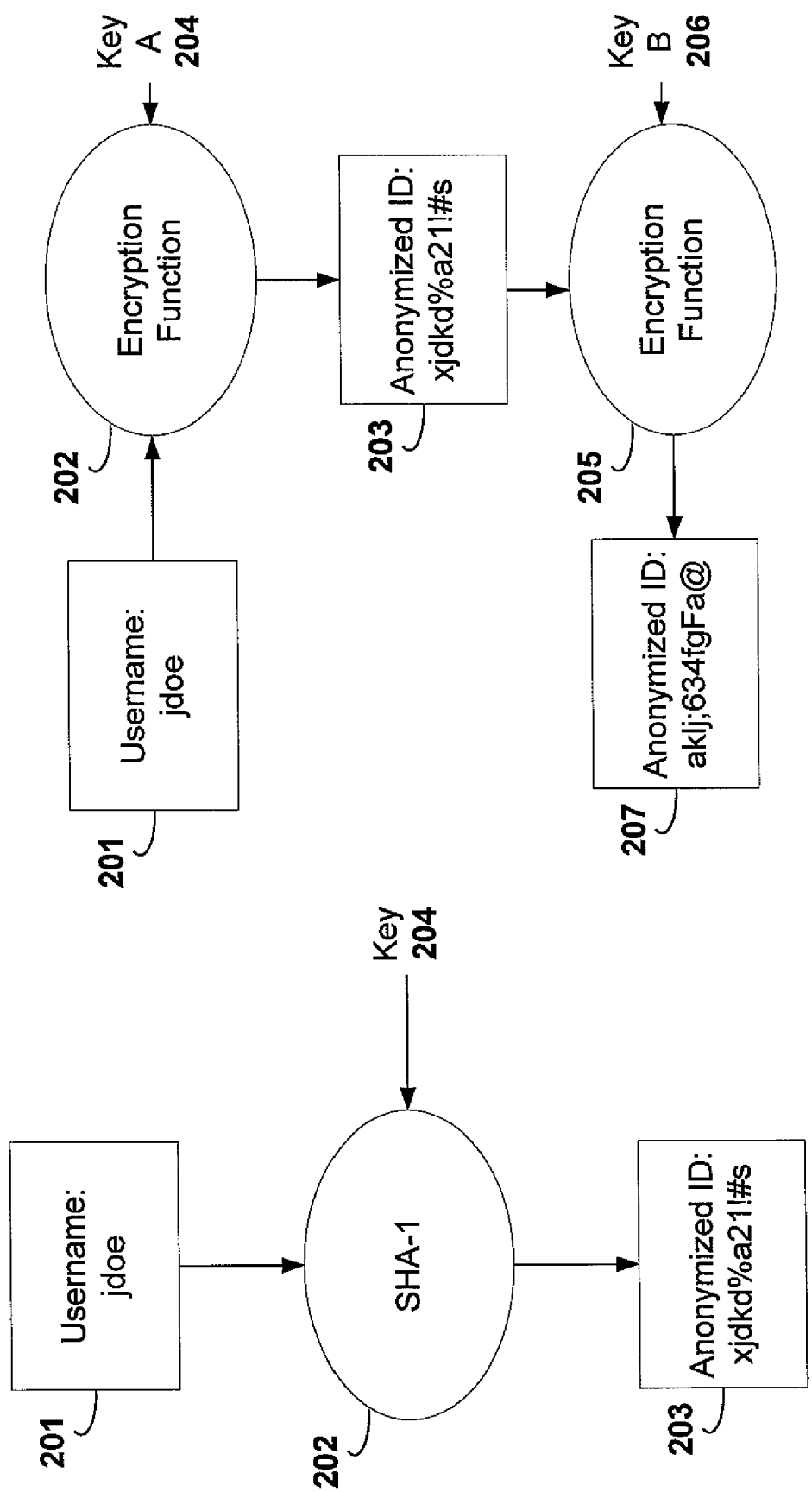
FIG. 2A is a schematic diagram illustrating how encryption is used to take a user's ID and create an Anonymized Identifier (AID) for purposes of tracking the session record in a transaction database.
FIG. 2B is a schematic diagram illustrating a two-pass encryption method for taking a user ID and creating an anonymized identifier for tracking user sessions.
Figure 3:
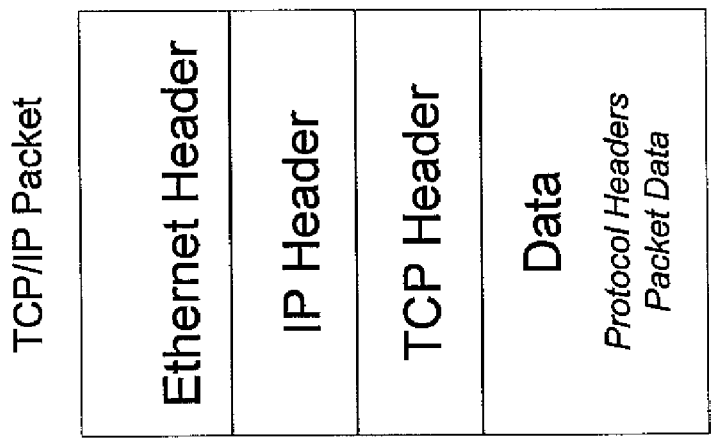
FIG. 3 is a block diagram of a typical data packet illustrating how data is extracted to determine interactions by the user to the host and the number of page hits established which can be tracked in accordance with the invention.

FIG. 2A shows an example of a unique identifier 203 being created from a username 201 and a key 204 using a one-way hashing function 202. In this example, the one-way hashing function is the Secure Hashing Algorithm (SHA) developed by the National Institute of Standards and Technology (NIST) and published as a Federal Information Processing Standard (FIPS PUB 180). The key 204 is appended to the username 201. One-way hashing function 202 is applied to the combined key 204 and username 201 to produce the anonymized identifier 203. Use of the key 204 makes it more difficult to decrypt the anonymized identifier and using a unique key for each ISP ensures usernames or other identifiers are unique across ISPs. One of skill in the art will readily appreciate that any other one-way hashing algorithm can be used with the present invention.

FIG. 2B shows a two-pass method for creating online behavioral profiles that are unassociated with individual users. This two-pass method is similar to the one-pass method shown in FIG. 2A. In this embodiment, a first anonymized identifier is creating as discussed above with regard to FIG. 2A. Then, the first anonymized identifier encrypted using one-way hashing function 205 along with key B 206 to create a second anonymized identifier 207. The two-pass technique allows a third party to assist without compromising the security of the resulting collected data.

When a user logged on to an ISP accesses a Web page located on a server 105, the user's workstation 101 opens a network interaction to the desired server 105 using the Internet Protocol. The network packets sent between workstation 101 and server 105 contain the network address of both devices; however, the packets do not contain a username. Thus, the collection engine 103 needs to associate a unique identifier 203 with a network IP address to record the transaction without associating any personally identifiable information with such data.

In order to create the unique identifier 203 and associate it with an IP address, the collection engine 103 needs to obtain a username. In one embodiment of the present invention, the collection engine 103 monitors the network for packets containing authentication information that associate a username with an IP address. For example, if the ISP 102 is using RADIUS to authenticate users, then the RADIUS server 107 sends an authentication packet containing a username associated with an IP address whenever a user successfully logs on to the network.

In alternative embodiments of the present invention, other authentication mechanisms may be used In most cases, the user identifier and IP address are sent across the network unencrypted and can be obtained by the collection engine 103; however, some authentication mechanisms may use encryption or may not be sent across the network. In some instances, the access server is configured to suggest an IP address to the RADIUS server 107; if the address is not taken, the RADIUS server 107 sends back a packet allowing the assignment. In these cases, one of ordinary skill in the art using conventional software development techniques can develop software to obtain the user identifier/IP address correlation. Some other methods that are commonly used to assign IP addresses to users are Dynamic Host Configuration Protocol (DHCP) and Bootp.

In one embodiment of the present invention, a collection engine 103 is an Intel™-based computer running Linux™. In order to maintain a high degree of security, the operating system is hardened using conventional techniques. For example, the "inetd" daemon and other unnecessary daemons are disabled to limit the possibility that an unauthorized user could gain access to the system. The collection engine 103 also includes one or more network interface cards (NIC) that allow the operating system to send and receive information across a computer network.

In some embodiments of the present invention, Internet network traffic and authentication network traffic may be sent across different networks. In this case, the collection engine 103 can use multiple NICs to monitor packets sent across the different networks. Additionally, a site may wish to monitor user activity on multiple networks. The collection engine 103 can monitor as many sites as the situation demands and the hardware supports.

Using the network and hardware configuration discussed above, we now turn to the software implementation of the collection engine 103. In accordance with the present invention, application software is installed that has been developed in a manner that is conventional and well-known to those of ordinary skill in the art, at the POP location within an ISP.

Figure 4:
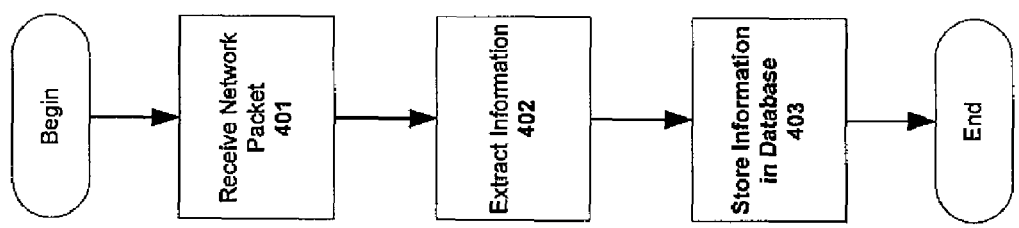
FIG. 4 is a block diagram of a typical method for collecting network transaction data whereby a system receives a network packet, extracts information from that packet, and stores the resulting information in a database.
Figure 5:
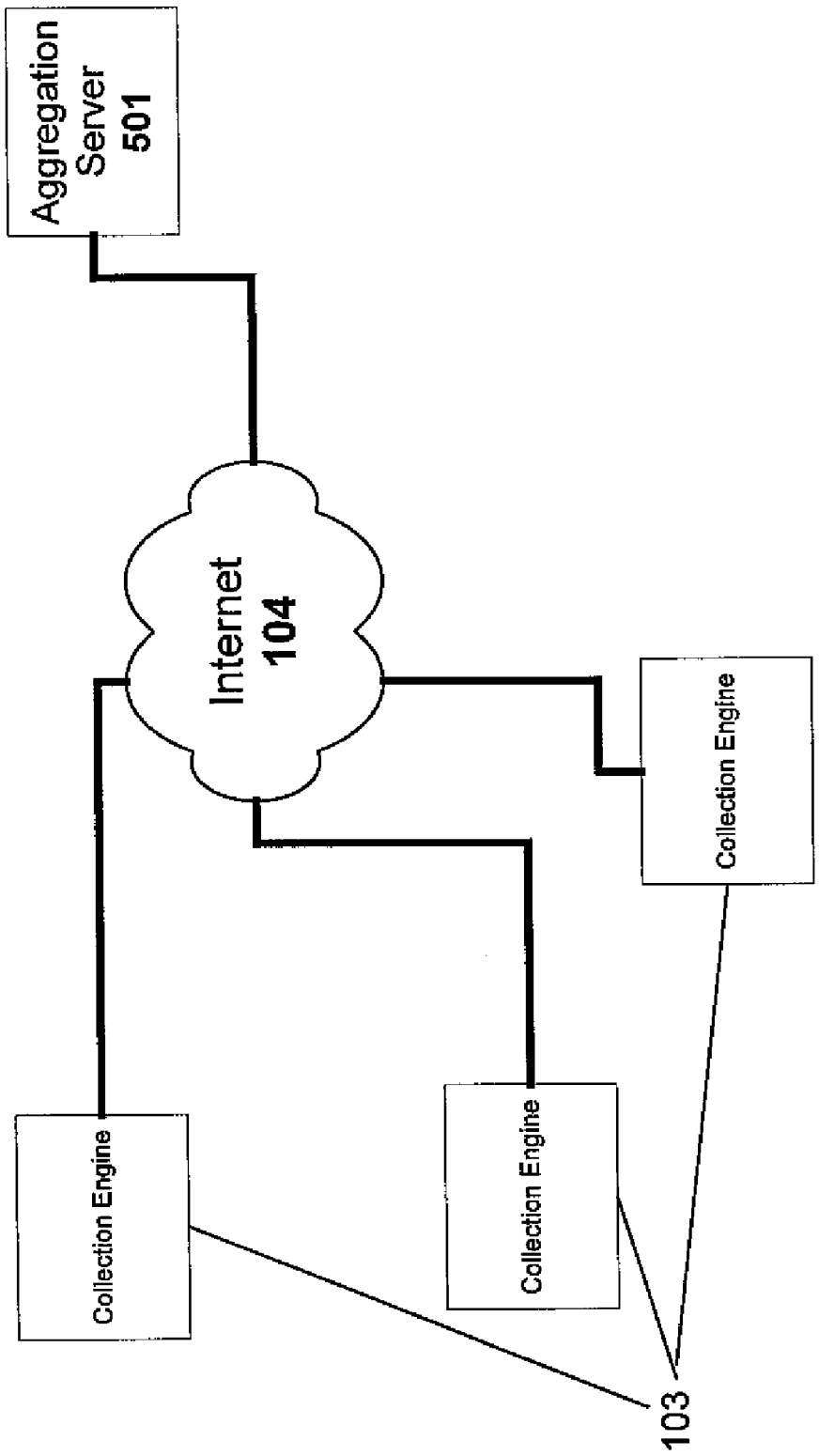
FIG. 5 is a general schematic diagram showing a configuration of a plurality of collection engines coupled to the Internet and an aggregation server coupled to the Internet whereby the aggregation server can collect and aggregate information stored on the various collection engines.

The software includes a process that monitors packets sent across the device's network interfaces as shown in FIG. 4. This embodiment of the present invention begins by waiting for a network packet to be received when a network packet is received in block 401, relevant data is extracted from the packet in block 402. The relevant data depends on the protocol of the received packet. For example, if the packet is a RADIUS packet, the relevant data would include a user identifier, an IP address, and the time of authentication. If the packet is an HTTP packet, the system extracts the relevant header information including the size of the packet and the source and destination IP addresses, and records this information along with the date and time of the request. In addition, the system also records the requested Uniform Resource Locator (URL). For other packet types, the system extracts information including the source and destination IP addresses, the source and destination ports, the size of the packet, and the time of transmission.

In the preferred embodiment of the present invention, the collection engine 103 is aware of several standard protocols including HTTP, File Transfer Protocol (FTP), RealAudio™, RealVideo™, and Windows Media™. When network interactions are made using one of these protocols, the collection engine 103 can collect additional information such as the name of the files requested.

One embodiment of the present invention also provides additional capabilities to track user sessions. For example, when a user is browsing a Web site, the user makes a series of separate requests to a Web server. In fact, a user may make several separate requests to a Web server in order to show a single Web page. When analyzing the behavior of a user to create a profile, it is useful to think of the related requests in terms of a single session instead of as multiple sessions. For example, when a user requests a Web page, the text of that Web page is downloaded along with each image referenced by that page. The user may then browse multiple pages within that Web site.

In one embodiment of the present invention, the collection engine 103 records the beginning of an interaction in a datastore when an initial HTTP network connection is opened. The system also records the time when that interaction was opened. Additional HTTP requests are determined to be within the same interaction until the interaction ends. In one embodiment of the present invention, interactions end after an inactivity period. In an additional embodiment of the present invention, interactions remain active for Transmission Control Protocol (TCP) connections until the connection is closed using TCP flow control mechanisms.

Once data has been collected by a collection engine 103, the data can be aggregated with data collected by other collection engines. For example, an ISP may have multiple POPs and may use a collection engine to collect data at each one. The resulting data can then be aggregated by a central aggregation server 501.

In one embodiment of the present invention, an aggregation server 501 is connected to the Internet 104 through a conventional mechanism. Additionally, one or more collection engines 103 are connected to the Internet 104. The aggregation server 501 can access each of the collection engines 103 to configure and maintain them, as well as to receive network transaction data. As discussed above, efforts are taken to maintain the security of each collection engine. For this reason, a secure mechanism for logging on to collection engines 103 and a secure mechanism to retrieve data are desirable. One embodiment of the present invention uses the Secure Shell (SSH) to provide strong authentication. This helps prevent unauthorized access to the server. SSH also provides a mechanism for encrypting the datastreams between collection engines 103 and an aggregation server 501. One of ordinary skill in the art will appreciate that many additional forms of secure login can be used, including one-time password systems and Kerberos™.

As stated above, the aggregation server 501 performs two major tasks: (1) configuration and management of collection engines 103; and (2) aggregating data from collection engines 103.

In one embodiment of the present invention, the aggregation server 501 monitors each collection engine 103 using a protocol based on the User Datagram Protocol (UDP). Every five minutes, a collection engine 103 sends a UDP packet to the aggregation server 501 signifying that the collection engine 103 is still alive. Additionally, the UDP packet also specifies the amount of data collected and the number of users currently using the system. In this manner, the aggregation server 501 can be alerted when a collection engine 103 crashes, loses its network connection, or stops collecting data. This permits the effective management of the collection engines 103 from a central aggregation server 501.

In alternative embodiments of the present invention, the collection engines 103 implement a Simple Network Management Protocol (SNMP) Management Information Base (MIB). The MIB includes information such as the time the collection server has been active, the amount of data stored on the server, and the number of active users and network sessions.

The aggregation server 501 also performs the additional task of collecting and aggregating data from the various collection engines 103. In one embodiment of the present invention, the data is collected at least once per day by the aggregation server 501 through a secure SSH connection as discussed above. The data is then initially validated so that corrupt packet information is removed and the data is sorted to facilitate loading into the central datastore.

In some embodiments of the present invention, the collection engines do not have enough storage to permit one collection every 24 hours. In these cases, the aggregation server can collect data from the collection engine more often than every 24 hours. In one embodiment of the present invention, the UDP-based management protocol discussed above can be used to determine when a collection needs to be scheduled. In addition to the information discussed above, the UDP-based management protocol also includes the percentage of collection storage that has been used. A threshold can be set to initiate a collection. For example, if a collection engine 103 sends a UDP-based management protocol packet stating that it has used 70% of its storage capacity, then the aggregation server can initiate the process of aggregating the data from that collection engine as discussed above.

In one embodiment of the present invention, aggregation server 501 is a Sun Microsystems Enterprise 6500™ server with sixteen (16) Sparc Ultra II™ processors and four (4) Fiber Channel connections to an EMC™ disk array. The aggregation server 501 includes an Oracle™ database that is configured to store data retrieved from the various collection engines 103.

In one embodiment of the present invention, the aggregation server 501 stores the following information that is retrieved from the various collection engines 103: (1) ISP, a representation of an ISP that collects data; (2) POP, a representation for a particular point of presence within an ISP; (3) AID, an anonymized user identifier; (4) Start Date, the date and time that an interaction began; (5) End Date, the date and time that an interaction ended; (6) Remote IP, the IP address of remote host (e.g., the IP address of a Web server being accessed by a user); (7) Remote Port, the port of the remote computer that is being accessed; (8) Packets To, the total number of packets sent during the interaction; (9) Bytes To, the total number of bytes sent to the remote server during an interaction; (10) Packets From, the total number of packets received from the remote computer; (11) Bytes From, the total number of bytes received from the remote computer; and (12) IP Protocol, the protocol code used during the interaction. For example, FIG. 6 shows a typical data table for the aggregation server.

Protocols such as HTTP and FTP contain additional information that can be useful in describing user behavior. One embodiment of the present invention collects additional information for these protocols. For example, FIG. 7 shows a representative data table containing additional HTTP information as follows: (1) HTTP Host, the hostname sent as part of the HTTP request; (2) HTTP URL, the Uniform Resource Locator requested; (3) HTTP Version, the HTTP version sent as part of the request.

The various embodiments of the present invention discussed above maintain the anonymity of the user by creating and using an anonymized identifier; however, the URL used in an HTTP request may contain identifying data. One embodiment of the present invention attempts to strip identifying data from URLs before storing them. According to this embodiment the system searches for the following words within a URL: "SID", "username", "login", and "password". If these are found, the system strips the associated identifying information. For example, if the URL were "/cgibin/shop.exe/?username=bob", then the system would strip "bob" from the URL so that this identifying information would not be stored in the aggregated database.

In one embodiment of the present invention, the aggregation server includes database-associating anonymized identifiers with a classification. For example, in one embodiment, the classification is the physical location of the user. This information is determined using the billing address of the user. There are commercial applications available that will translate a well-formed address into a Census block group code identifying the general location of that address.

In another embodiment, user classification is based on the phone number that the user dials from as transmitted using the Automatic Number Identifier (ANI) information transmitted through the Public Switched Telephone Network (PSTN), the same information used to provide the Caller ID™ service. Since the area code and exchanges of telephone numbers generally relate to a geographical area, this can be used to help identify the locality of users. For example, if ANI transmits the number 202-936-1212, the area code "202" and the exchange "936" can be used to determine the general location of the user.

Figure 8:
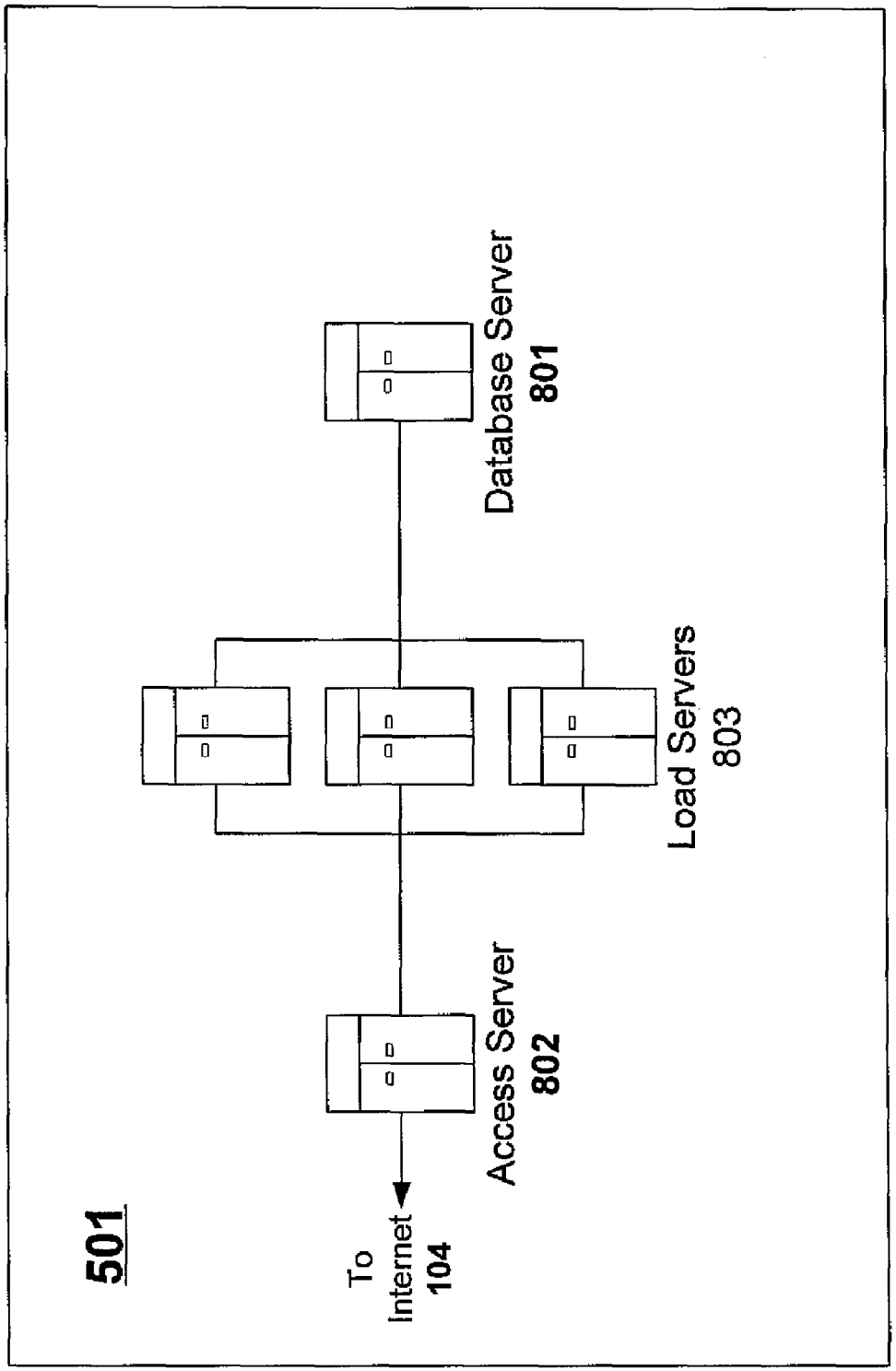
FIG. 8 shows an additional embodiment of the present invention where the functionality of the aggregation server is spread over multiple servers to increase the performance and scalability of the overall system.

In an additional embodiment of the present invention, the aggregation server 501 functionality is spread over multiple servers to increase the performance and scalability of the system as shown in FIG. 8. In this embodiment, the database server 801 is a Sun Microsystems. Enterprise 6500™ server as described above with reference to aggregation server 501. Database server 801 contains an Oracle™ database storing all the aggregated data.

Access server 802 is a single, secure server that gives the ability to log on to remote collection engines 103 using SSH, or some other secure mechanism, as described above. Access server 802 is the only machine that needs to have the keys necessary to securely log on to remote machines. By segregating this functionality to a single server or to a small number of servers, it is easier to monitor, configure, and maintain the access server 802 for increased security.

The access server 802 logs onto remote collection engines 103 and transfers the collected data to one load server 803. Each load server 803 receives collected data, processes the data, and loads it into database server 801. The present invention can be embodied with one or more load servers 803. If a plurality of load servers 803 are used, any load balancing techniques can be used to distribute load across the multiple load servers 803. For example, the access server 802 can use a simple round robin technique whereby the access server 802 rotates through a list of available load servers. The access server 802 can also use a technique whereby the central processing unit load is measured for each load server 803. The server with the lowest load is given the collection to process. Other load balancing techniques are known to those of skill in the art and any such technique could be used with the present invention.

In another embodiment of the present invention, anonymized identifiers are associated with job functions. For example, a company may wish to monitor how classes of employees are using computer network resources. An anonymized identifier representing a single employee can be associated with a job function classification so that network utilization by employees with the same job function classification can be aggregated. One of ordinary skill in the art will readily appreciate that other classification systems can be used with the present invention.

Embodiments of the present invention have now been generally described in a non-limiting matter. It will be appreciated that these examples are merely illustrative of the present invention, which is defined by the following claims. Many variations and modifications will be apparent to those of ordinary skill in the art.

What is claimed is:

1. A computer-implemented method for collecting network usage data about one or more users accessing a network and resources thereon without associating personally identifiable information with the usage data, comprising:
    maintaining an anonymized identifier relating to a user of a computer network, wherein the anonymized identifier does not reveal personal information of the user;
    identifying first data relating to a network communication session between an external network system and the user;
    identifying a record of a network request comprising a resource location identifier, the network request being related to the network communication session;
    generating a second resource location identifier, wherein generating the second resource location identifier comprises stripping personally identifying data from the resource location identifier based on matching one or more patterns against the resource location identifier; and
    storing the second resource location identifier in association with the anonymized identifier and the data relating to the network communication session.

2. The computer-implemented method of claim 1, wherein the anonymized identifier is created by applying a one-way hashing function to data comprising the obtained identifier.

3. The computer-implemented method of claim 2, wherein the data to which the one-way hashing function is applied further comprises a security key.

4. The computer-implemented method of claim 2, wherein the one-way hashing function includes one or more of the following hashing functions: the Secure Hashing Algorithm 1 (SHA-1), the Message Digest 4 (MD4) algorithm, the Message Digest 5 (MD5) algorithm, or Digital Encryption Standard (DES).

5. The computer-implemented method of claim 1, further comprising monitoring network traffic, collecting data about network transactions and recording the collected data.

6. The computer-implemented method of claim 5, further comprising creating one or more online behavioral profiles, based at least in part on the collected data.

7. The computer-implemented method of claim 1, wherein matching one or more patterns against the resource location identifier comprises searching for a predefined set of words in the resource location identifier.

8. The computer-implemented method of claim 1, wherein the resource location identifier is a Uniform Resource Locator.

9. The computer-implemented method of claim 1, further comprising associating the anonymized identifier with a physical location of the user.

10. The computer-implemented method of claim 9, wherein the physical location of the user is based on a billing address of the user.

11. The computer-implemented method of claim 9, wherein the physical location of the user identifies the general location of that address without revealing personally identifying information of the user.

12. A computer system configured to collect network usage data, the computer system comprising:
    computer storage having stored thereon a plurality of modules implemented as executable instructions;
    one or more computer processors configured to execute the executable instructions stored on the computer storage medium; and
    a user information storage medium having stored thereon an anonymized identifier relating to a user of a computer network, wherein the anonymized identifier does not reveal personal information of the user;
    the plurality of modules including a first module configured to identify first data relating to a network communication session between an external network system and the user;
    the plurality of modules including a second module configured to identify a record of a network request comprising a resource location identifier, the network request being related to the network communication session;
    the plurality of modules including a third module configured to generate a second location identifier, wherein generating the second resource location identifier comprises stripping personally identifying data from the resource location identifier based on matching one or more patterns against the resource location identifier; and
    the plurality of modules including a fourth module configured to store the second resource location identifier in association with the anonymized identifier and the data relating to the network communication session.

13. The computer system of claim 12, wherein the anonymized identifier is created by applying a one-way hashing function to data comprising the obtained identifier.

14. The computer system of claim 13, wherein the data to which the one-way hashing function is applied further comprises a security key.

15. The computer system of claim 13, wherein the one-way hashing function includes one or more of the following hashing functions: the Secure Hashing Algorithm 1 (SHA-1), the Message Digest 4 (MD4) algorithm, the Message Digest 5 (MD5) algorithm, or Digital Encryption Standard (DES).

16. The computer system of claim 12, wherein the plurality of modules further includes a fifth module configured to monitor network traffic, collecting data about network transactions and recording the collected data.

17. The computer system of claim 16, wherein the plurality of modules further includes a sixth module configured to create one or more online behavioral profiles, based at least in part on the collected data.

18. The computer system of claim 12, wherein matching one or more patterns against the resource location identifier comprises searching for a predefined set of words in the resource location identifier.

19. The computer system of claim 12, wherein the resource location identifier is a Uniform Resource Locator.

20. The computer system of claim 12, wherein the plurality of modules further includes a fifth module configured to associate the anonymized identifier with a physical location of the user.

21. The computer system of claim 20, wherein the physical location of the user is based on a billing address of the user.

22. The computer system of claim 20, wherein the physical location of the user identifies the general location of that address without revealing personally identifying information of the user.

23. Non-transitory computer storage having stored thereon a plurality of executable instructions configured to cause one or more processors to perform operations comprising:

reading an anonymized identifier relating to a user of a computer network, wherein the anonymized identifier does not reveal personal information of the user;

identifying first data relating to a network communication session between an external network system and the user;

identifying a record of a network request comprising a resource location identifier, the network request being related to the network communication session;

generating a second resource location identifier, wherein generating the second resource location identifier comprises stripping personally identifying data from the resource location identifier based on matching one or more patterns against the resource location identifier; and storing the second resource location identifier in association with the anonymized identifier and the data relating to the network communication session.

\* \* \* \* \*